June 21, 1932.  C. G. BRIEL  1,863,827
METHOD OF PRODUCING COMPOSITE PICTURES
Filed Oct. 12, 1931
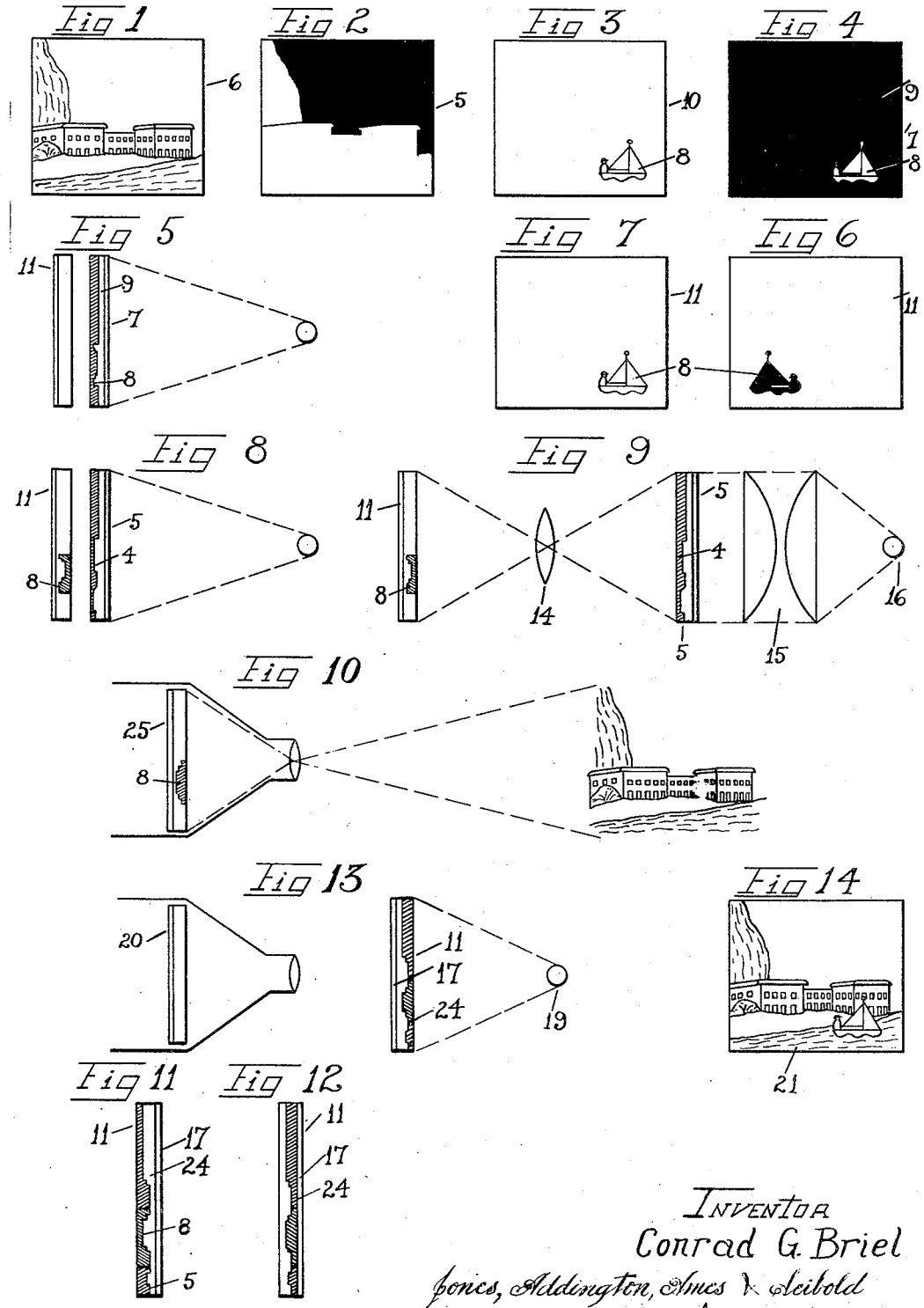

Patented June 21, 1932

1,863,827

UNITED STATES PATENT OFFICE

CONRAD G. BRIEL, OF CHICAGO, ILLINOIS, ASSIGNOR TO CINEMA DEVELOPMENT COMPANY, OF CHICAGO, ILLINOIS, A CORPORATION OF ILLINOIS

METHOD OF PRODUCING COMPOSITE PICTURES

Application filed October 12, 1931. Serial No. 568,389.

This invention relates to a new and improved method of producing composite pictures in photography.

More particularly, the invention relates to a simple, accurate, rapid, and inexpensive method of superposing one or more foreground images upon backgrounds whereby composite photographs may be produced entirely from previously taken films, or from a combination of previously taken film and objects, such as studio actions and background scenery, or directly from both studio actions and background scenery.

Specifically, the present invention is a radical departure from the methods heretofore employed. In co-pending application, Serial No. 169,173, filed February 18, 1927, the broad idea of producing composite photographs by single exposure is disclosed. A foreground, whether object or image, is used, which is opaque to and reflective of light, so that when superimposed upon a background and illuminated by transmitted and reflected light, the details of the foreground will appear upon the composite photograph as part of the background without the details of the background appearing through the foreground image. In the present method, instead of producing the composite photograph by a single exposure, I preferably expose the foreground and background separately to a photographic film, but treat this film after first exposed to the foreground in a manner to secure opacity and light reflectivity of the photographically impressed foreground image, so that when this film is thereafter exposed to the background, the details of the background will not interfere with the details of this foreground image, but will be printed in the surrounding sensitive area. From this compound image film I produce a final composite picture. It is not essential that the illumination include both transmitted and reflected light, as heretofore, because the step of treating the film after exposure eliminates the need of illumination by reflection and requires illumination by transmission only to illuminate the image details for photographing. This method possesses many advantages over methods formerly devised for the making of such composite pictures, most of which involve in some form or other either single exposure, as broadly disclosed in the aforesaid co-pending application, or what is known as double exposure, either by exposure of a photographic film first to the foreground object or subject illuminated by reflected light and then to the background, with the foreground object or subject illuminated from the rear only to appear as a silhouette during exposure to the background, or by successive printing exposures of a photographic film to previously taken photographs of the foreground and of the background, this particular method heretofore requiring the use of a traveling mat. Double exposure methods as thus practiced are slow, inaccurate and tedious to perform, resulting in imperfect composite pictures which evidence upon their completion that the foreground was not a part of the original background scene, this being highly undesirable because it lessens the value of the picture. The present method may be practiced to produce composite pictures accurately and speedily, without possible detection that the finished picture is the work of superimposing.

In order to apprise those skilled in the art how to practice my invention, I shall now describe several preferred embodiments thereof in connection with the accompanying drawing, which forms a part hereof.

In the drawing:

Figure 1 is a front elevation of a positive background scene, the film being that usually employed in photography;

Fig. 2 is a negative of the background scene shown in Fig. 1;

Fig. 3 is a positive film of the foreground image;

Fig. 4 is a negative of the foreground image shown in Fig. 3;

Fig. 5 illustrates the first printing step of the method embodying the invention herein disclosed, which includes over-exposing the photographic film to the negative foreground;

Fig. 6 is the same over-exposed positive photographic film shown in Fig. 5 (looking at the emulsion side) after being treated in accordance with the teachings of the present invention to render the foreground image opaque to transmitted light;

Fig. 7 is the same over-exposed positive photographic film looking at the base or celluloid side, illustrating the foreground image;

Fig. 8 illustrates the second printing step involved in the method disclosed herein;

Fig. 9 illustrates the same step accomplished by projection printing;

Fig. 10 illustrates exposing a photographic film, having a treated negative foreground image thereon, to a natural background;

Fig. 11 is an enlarged cross-sectional view to illustrate how over-exposing and deeply developing the compound image produces opacity and leaves varying thicknesses of sensitive photographic material between the image and base;

Fig. 12 is a similar view of this film after subjected to further treatment to produce a master negative film of the composite picture;

Fig. 13 illustrates exposing a fresh actinic surface to the master negative film shown in Fig. 12, the latter being illuminated by transmitted light only; and Fig. 14 is a front elevational view of a positive of the composite or superposed picture.

The components used may be the usual black and white diapositives, such as the ordinary cinema projecting film used in still photography, or they may be paintings on plates, depending upon the characters or images to be combined and the superimposing to be done, it being also understood that the background may be the actual background scene, as well as film or paintings.

When the extensively used present-day film is developed, the images are formed by fixation of innumerable minute particles of metallic silver imbedded in the gelatin of the photographic emulsion, there being relatively more silver particles in the shadows than in the high-lights, but somewhat uniformly distributed throughout the depth of the photographic emulsion. The present invention is very well adapted to this type of photographic film, but it will be understood that the invention might well be applied to other film where the images are produced in a different manner, or have different physical characteristics.

As shown in the drawing, the background may be scenery, or other objects in the form of a painting, or a photographic film transparency, and may be produced by making the necessary negative 5. A positive print 6 of negative 5 is shown in Fig. 1.

As a specific example, the foregoing component 7, shown in Fig. 4, may be a negative of the foreground action preferably taken before a white screen or ground so that the impressed foreground image 8 upon film 7 will be surrounded by a silver deposit 9. A positive print 10 of negative 7 is shown in Fig. 3. By illustrating positive prints 6 and 10 of the background and foreground components, although the making of these positive prints is not necessary to and is not a step of the method disclosed, it will be apparent that, by practicing the method, a composite picture may be made wherein the details of the background component do not interfere with the details of the foreground component.

A print of foreground negative 7 may be made as shown in Fig. 5, and it is preferable that this photographic print may be slightly over-exposed in this step so that it may be developed deeply. The developing action is continued until the silver deposit throughout the depth of the foreground image 8, photographically impressed upon film 11, produces substantial opacity to transmitted light as shown in Fig. 6, and the inner particles of metallic silver show the image details on the celluloid side of the film, as shown in Fig. 7.

The developer, which may be any well-known kind suitable for the purpose, may then be washed out and film 11 allowed to dry. If the developer exhibits a tendency to continue its action during the washing of the film, and this is found undesirable, then film 11 may be subjected to any well-known stop bath before the washing.

Film 11, after being thus treated, is then exposed to a background component. In Fig. 8, I have illustrated exposure of film 11 by contact printing to background negative 5. However, this exposure of film 11 may be by projection printing, as shown in Fig. 9, in which case the background scene may be made larger or smaller or shifted from side to side merely by adjusting such parts as 11 and 14, as a unit with respect to parts 5, 15 and 16 as a unit, as well as the focusing, or it may be by the usual step of photographing where film 11 containing a negative foreground image will be exposed to natural background scenery, as shown in Fig. 10. Film 11 may be over-exposed, if so desired, when printing in the background component, and it may likewise be developed deeply until it shows the image details of the background impression plainly on the celluloid side 17.

Film 11 is then washed to remove the developing re-agent and dried. If found desirable, film 11 may be subjected to a stop bath before washing in order to control the density of the metallic silver so that, as above stated, the image details will plainly show by reflected light on the celluloid side 17.

As an example of the treatment film 11 is subjected to, in order that it may be illuminated by transmitted light during exposure to produce a final composite picture, this film 11 may be treated with a solution of potassium permanganate and sulphuric acid, or a solution of chromic acid, to remove the metallic silver and thereby to produce a composite image of silver bromide or silver chloride, or other sensitive photographic emulsion.

In the action of removing the metallic silver and leaving the sensitive photographic material to form the image, reversing the positive character of film 11 to a negative, if a solution of potassium permanganate and sulphuric acid is used, it might be desirable to subject film 11 to a bath of acid sulphite or an equivalent solution to remove the stain caused by the permanganate. The film 11 may be again washed to provide a finished master negative film.

It will be apparent that the steps described do not include treating film 11 after developing to a fixing bath. By not fixing the film, the undeveloped sensitive photographic material is allowed to remain to form the image after treating the film to remove the metallic silver.

As shown in Fig. 13, film 11 may then be illuminated by transmitted light, such as by one or more illuminators 19, and exposed to a fresh actinic surface 20 whereby any number of positive prints may be made showing the complete composite picture 21, shown in Fig. 14.

If a contrasty film is desired, that is to say, if it is desirable to print the images sharply so as to produce contrast, film 11, after it has been treated to remove the metallic silver and to produce a composite image of the sensitive photographic material, may be exposed to light and developed, washed and dried. In this condition, film 11 is a master negative, having its image details formed of metallic silver instead of the remaining unfixed sensitive photographic material such as silver bromide.

In the event the ordinary photographic film is used wherein the images are formed by the fixation of innumerable minute particles of metallic silver imbedded in gelatin comprising the photographic emulsion, the undeveloped sensitive photographic material may comprise an undeveloped silver salt, such as a silver bromide or a silver chloride. If different film are used, it will be apparent that the material remaining in the emulsion after the developing bath will be the equivalent of material 24. The broad concept of the present invention is intended to include such equivalent material, which material may be employed to form the image.

I find that image 8, if it is correctly exposed and developed on film 11, is sufficiently opaque to prevent transmission of light to the layer of undeveloped sensitive photographic material beneath, at the time of exposing the background component 5 thereto, and consequently, no background image detail will be visible in a finished picture where a foreground action exists.

If it is found at any time that the foreground image has not been made sufficiently opaque to serve its purpose, the emulsion side may be subjected momentarily to a flash exposure and again developed, or the non-opaque areas of the image may be coated with a black or non-actinic material.

The method disclosed is extremely flexible with regard to the selection of the type of components which may be used. Four separate combinations may be used satisfactorily:

(a) A foreground made from a previously prepared foreground negative may be used with a background action prepared from a previously photographed background negative.

(b) A treated negative foreground action made from a previously taken positive foreground action may be used with a natural background scene.

(c) A natural foreground scene may be photographed, the film prepared and used directly with a previously taken background scene.

(d) A natural foreground scene may be photographed, the film prepared and used directly with a natural background scene.

In connection with this latter arrangement of components, it may be mentioned that by using the present method, a couplete composite picture may be made with the same amount of film now necessary to produce an ordinary photographic picture. This is effected by photographing and over-exposing the foreground before a black or non-actinic screen, say on film 25, (which will correspond to positive film 11) developing deeply to produce a dense image, washing and then exposing this film to a natural background, as shown in Fig. 10, and then again developing the film, washing and subjecting it to a treatment to reverse the character of the image by removing the metallic silver and obtaining an image of sensitive photographic material, and finally photographing, by transmitted light, to produce a final composite picture. Here, also, the film thus treated may be subjected to a developing bath to change the sensitive photographic material to a metallic silver so that a contrasty master negative will be produced.

While I have shown the various printing steps to involve printing with the emulsion sides facing each other, it will be understood that different positioning of the film may be had without departing from the scope of the invention.

In the drawing, the photographic emulsion is shown considerably thicker in cross section than the celluloid base contrary to the actual proportions generally used in the ordinary photographic film, but it will be understood that this showing is made for the purpose of illustration only, that these proportions may vary, and that the proportions of the standard photographic film are also contemplated.

Other advantages and objects will be apparent to those skilled in the art, and therefore I do not wish to be limited to the exact details or steps described or shown herein, since many modifications are possible without departing from the spirit and scope of the invention.

I claim:

1. The method of producing a composite photograph embodying a foreground component superposed upon a background component which includes making successive photographic silver deposit images of both components surrounded by undeveloped photographic material, and making a reverse image illuminable by transmitted light by removing the silver deposit.

2. The method of producing a composite photograph embodying two or more component parts which includes exposing a sensitized film to one of the components making a photographic silver deposit image thereof substantially opaque to light, exposing said film to the other component making a photographic silver deposit image thereof, both of said photographic silver deposit images on said film being formed without removing the surrounding undeveloped photographic material, and making reverse images illuminable by transmitted light by removing the silver deposit.

3. The method of producing a composite photograph embodying two component parts which includes exposing a sensitized film to one of the components making a photographic silver deposit image thereof relatively opaque to light, exposing said film to the other component making a photographic silver deposit thereof, both of the silver deposit images being formed without removing the surrounding undeveloped photographic material, treating the film to remove the silver deposit, illuminating the film by transmitted light, and exposing a fresh actinic surface to said film so illuminated.

4. The method of producing a composite photograph embodying two component parts which includes exposing a sensitized film to one of the components making a photographic silver deposit image thereof relatively opaque to light, exposing said film to the other component making a photographic silver deposit image thereof, both of said images being formed upon said film without removing the surrounding undeveloped photographic material, making reverse images by removing the silver deposit, and treating the reverse images to convert the undeveloped photographic material into a silver deposit.

5. The method of producing a composite photograph embodying two component parts which includes exposing a sensitized film to one of the components making a photographic silver deposit image thereof relatively opaque to light, exposing said film to the other component making a photographic silver deposit image thereof, both of said images being formed upon said film without removing the surrounding undeveloped photographic material, treating the film to remove the silver deposit, converting the undeveloped photographic material into a silver deposit, illuminating the film by transmitted light, and exposing a fresh actinic surface to the film so illuminated.

6. The method of producing a composite photograph embodying two or more components which includes making separate exposures of the component parts upon a photographic sensitized emulsion, treating the photographic sensitized emulsion after each exposure to make a photographic silver deposit image of each component which is reflective of light, and treating the reflective composite picture so formed to make it transmissive to light by dissolving away the silver deposit to leave a reverse image of the components from which prints may be made by direct contact.

7. The method of producing a composite photograph embodying two or more components which includes making separate exposures of the component parts upon a photographic sensitized emulsion, treating the photographic sensitized emulsion after each exposure to make a photographic silver deposit image of each component which is reflective of light, and treating the reflective composite picture so formed to make it transmissive to light by removing the silver deposit to leave a reverse image of the components from which prints may be made by direct contact.

8. The method of producing a composite photograph embodying two or more component parts which includes making separate exposures of the component parts upon a photographic sensitized emulsion, treating the photographic sensitized emulsion after each exposure to make a varying silver deposit image of each component which is reflective of light, and treating the photographic sensitized emulsion to remove the silver deposit whereby to produce images as a residue of the undeveloped silver salt in thickness varying inversely with the thickness of the silver removed.

9. The method of producing a composite photograph embodying two or more component parts which includes making a photographic impression of one component upon a sensitized film, treating the photographic impression to produce a mask thereof on one side of said film and on the other side of said film an image thereof varyingly reflective of light, exposing the other component to the mask side of said film to produce thereon a photographic impression of the other component, both of said photographic impressions being formed upon said film without removing the remaining undeveloped photographic material, and treating the film to remove the photographic impressions whereby to produce reverse images thereof illuminable by transmitted light.

In witness whereof, I have hereunto subscribed my name.

CONRAD G. BRIEL.